(12) United States Patent
Tanaka et al.

(10) Patent No.: US 10,969,305 B2
(45) Date of Patent: Apr. 6, 2021

(54) TURBINE SYSTEM WITH PLANNING DEVICE GENERATING USAGE PLAN OF COMPONENTS, AND PLANNING METHOD

(71) Applicant: Mitsubishi Hitachi Power Systems, Ltd., Kanagawa (JP)

(72) Inventors: Toru Tanaka, Yokohama (JP); Akihisa Endo, Yokohama (JP); Yusuke Hazui, Tokyo (JP); Masumi Nomura, Tokyo (JP)

(73) Assignee: MITSUBISHI POWER, LTD., Kanagawa (JP)

(*) Notice: Subject to any disclaimer, the term of this patent is extended or adjusted under 35 U.S.C. 154(b) by 214 days.

(21) Appl. No.: 15/770,795

(22) PCT Filed: Oct. 25, 2016

(86) PCT No.: PCT/JP2016/081542
§ 371 (c)(1),
(2) Date: Apr. 25, 2018

(87) PCT Pub. No.: WO2017/073544
PCT Pub. Date: May 4, 2017

(65) Prior Publication Data
US 2018/0313720 A1    Nov. 1, 2018

(30) Foreign Application Priority Data
Oct. 28, 2015 (JP) .............................. JP2015-211898

(51) Int. Cl.
*G01M 15/14* (2006.01)
*F02C 7/00* (2006.01)
(Continued)

(52) U.S. Cl.
CPC ............. *G01M 15/14* (2013.01); *F01L 25/00* (2013.01); *F02C 7/00* (2013.01); *G01M 7/025* (2013.01); *G01M 15/02* (2013.01)

(58) Field of Classification Search
None
See application file for complete search history.

(56) References Cited

U.S. PATENT DOCUMENTS

| 6,158,207 A |  | 12/2000 | Polenick et al. |
| 6,349,252 B1 | * | 2/2002 | Imanishi ................ G08C 15/06 |
|  |  |  | 701/32.7 |

(Continued)

FOREIGN PATENT DOCUMENTS

| JP | 61-202136 | 9/1986 |
| JP | 2002-195056 | 7/2002 |

(Continued)

OTHER PUBLICATIONS

International Search Report dated Dec. 20, 2016 in International (PCT) Application No. PCT/JP2016/081542.
(Continued)

*Primary Examiner* — Leland Marcus
(74) *Attorney, Agent, or Firm* — Wenderoth, Lind & Ponack, L.L.P.

(57) ABSTRACT

A planning device according to the present invention includes a remaining life specifying unit that specifies a remaining life of a component for a turbine. On the basis of the specified remaining life, a usage plan generating unit generates a usage plan that indicates the timing at which the component is to be incorporated into the turbine, such that the remaining life of the component becomes equal to or less than an allowable error value at a predetermined timing.

6 Claims, 6 Drawing Sheets

(51) Int. Cl.
  *G01M 7/02* (2006.01)
  *G01M 15/02* (2006.01)
  *F01L 25/00* (2006.01)
  *F01D 25/00* (2006.01)

(56) References Cited

U.S. PATENT DOCUMENTS

| | | | |
|---|---|---|---|
| 2002/0120412 A1 | 8/2002 | Hayashi et al. | |
| 2004/0240600 A1* | 12/2004 | Freyer | G01M 15/14 376/159 |
| 2004/0260512 A1* | 12/2004 | Olsson | G01M 13/021 702/182 |
| 2006/0111871 A1 | 5/2006 | Winston | |
| 2007/0084049 A1* | 4/2007 | Wang | B23P 6/002 29/889.1 |
| 2011/0137575 A1* | 6/2011 | Koul | G05B 23/0245 702/34 |
| 2012/0162192 A1* | 6/2012 | Wang | F01D 11/14 345/419 |
| 2014/0088887 A1* | 3/2014 | Poon | G01M 13/00 702/34 |
| 2014/0163838 A1* | 6/2014 | Moeckly | F02C 9/00 701/100 |
| 2015/0121872 A1 | 5/2015 | Yashiki et al. | |
| 2015/0220875 A1* | 8/2015 | Tamaki | G06Q 10/06 705/7.23 |
| 2016/0160762 A1* | 6/2016 | Chandra | F01D 21/14 701/100 |
| 2016/0231716 A1* | 8/2016 | Johnson | G05B 13/041 |

FOREIGN PATENT DOCUMENTS

| | | |
|---|---|---|
| JP | 2002-330541 | 11/2002 |
| JP | 2002-330542 | 11/2002 |
| JP | 2005-240776 | 9/2005 |
| JP | 2006-146928 | 6/2006 |
| JP | 2015-90091 | 5/2015 |

OTHER PUBLICATIONS

Written Opinion of the International Searching Authority dated Dec. 20, 2016 in International (PCT) Application No. PCT/JP2016/081542.

* cited by examiner

TURBINE SYSTEM WITH PLANNING DEVICE GENERATING USAGE PLAN OF COMPONENTS, AND PLANNING METHOD

TECHNICAL FIELD

The present invention relates to a planning device that generates a usage plan for a component for a turbine, a planning method, and a program.

This application claims priority based on JP 2015-211898 filed in Japan on Oct. 28, 2015, of which the contents are incorporated herein by reference.

BACKGROUND ART

In Patent Document 1, a technology is disclosed that, in the rotation planning of a hot part of a gas turbine, minimizes a life of the hot part remaining at the time of disposal of the hot part, by changing a timing of a self-inspection when the remaining life of the hot part is less than the next scheduled operation period.

CITATION LIST

Patent Document

Patent Document 1: JP 2002-195056 A

SUMMARY OF INVENTION

Technical Problem

However, in some plants, self-inspections are not implemented, and only periodic inspections are carried out. In this case, with the technology disclosed in Patent Document 1, the remaining life of the component may not be minimized.

An object of the present invention is to provide a planning device, a planning method, and a program that allow a component for a turbine to be used efficiently without changing a timing of a self-inspection.

Solution to Problems

According to a first aspect of the present invention, a planning device includes: a remaining life specifying unit that specifies a remaining life of a component for a turbine; and a usage plan generating unit that generates, on the basis of the specified remaining life, a usage plan that indicates a timing at which the component is to be incorporated into the turbine such that the remaining life of the component becomes equal to or less than an allowable error value at a predetermined timing.

According to a second aspect of the present invention, in the planning device according to the first aspect, the usage plan generating unit generates, on the basis of the specified remaining life, the usage plan such that the remaining life of each of a plurality of components that have been incorporated into the same turbine becomes equal to or less than the allowable error value at the same timing.

According to a third aspect of the present invention, the planning device according to the second aspect further includes an operation plan generating unit that determines a load of the turbine into which the components are to be incorporated such that the timing coincides with an inspection timing of the turbine.

According to a fourth aspect of the present invention, in the planning device according to the second or third aspect, when the remaining life of a first component and the remaining life of a second component are shorter than an interval between periodic inspections, and a difference between the remaining life of the first component and the remaining life of the second component is equal to or less than an allowable error value, the usage plan generating unit generates the usage plan that indicates that the first component and the second component are to be incorporated into the same turbine.

According to a fifth aspect of the present invention, in the planning device according to the first aspect, the usage plan generating unit generates, on the basis of the specified remaining life, the usage plan such that the remaining life of the component that has been incorporated into the turbine becomes equal to or less than the allowable error value at an inspection timing of the turbine.

According to a sixth aspect of the present invention, the planning device according to the fifth aspect further includes a spent life calculating unit that calculates, for a plurality of turbines, a life of the component spent during an interval between periodic inspections. The usage plan generating unit generates the usage plan that indicates a number of times of incorporation into each of the plurality of turbines, such that a difference between a total sum of values obtained by multiplying the number of times of incorporation into each of the plurality of turbines with the spent life, and the remaining life of the component becomes equal to or less than a predetermined value.

According to a seventh aspect of the present invention, a planning method includes the steps of: specifying a remaining life of a component for a turbine; and generating, on the basis of the specified remaining life, a usage plan that indicates a timing at which the component is to be incorporated into the turbine such that the remaining life of the component becomes equal to or less than an allowable error value at a predetermined timing.

According to an eighth aspect of the present invention, a program causes a computer to function as: a remaining life specifying unit that specifies a remaining life of a component for a turbine; and a usage plan generating unit that generates, on the basis of the specified remaining life, a usage plan that indicates a timing at which the component is to be incorporated into the turbine such that the remaining life of the component becomes equal to or less than an allowable error value at a predetermined timing.

Advantageous Effects of Invention

According to at least one of the above-described aspects, the planning device generates the usage plan so as to cause the remaining life of the component to be equal to or less than the allowable error value. In this way, the planning device allows the component for the turbine to be efficiently used without changing a timing of a self-inspection.

DESCRIPTION OF EMBODIMENTS

First Embodiment

A first embodiment will be described below in detail with reference to the appended drawings.

Figure 1:
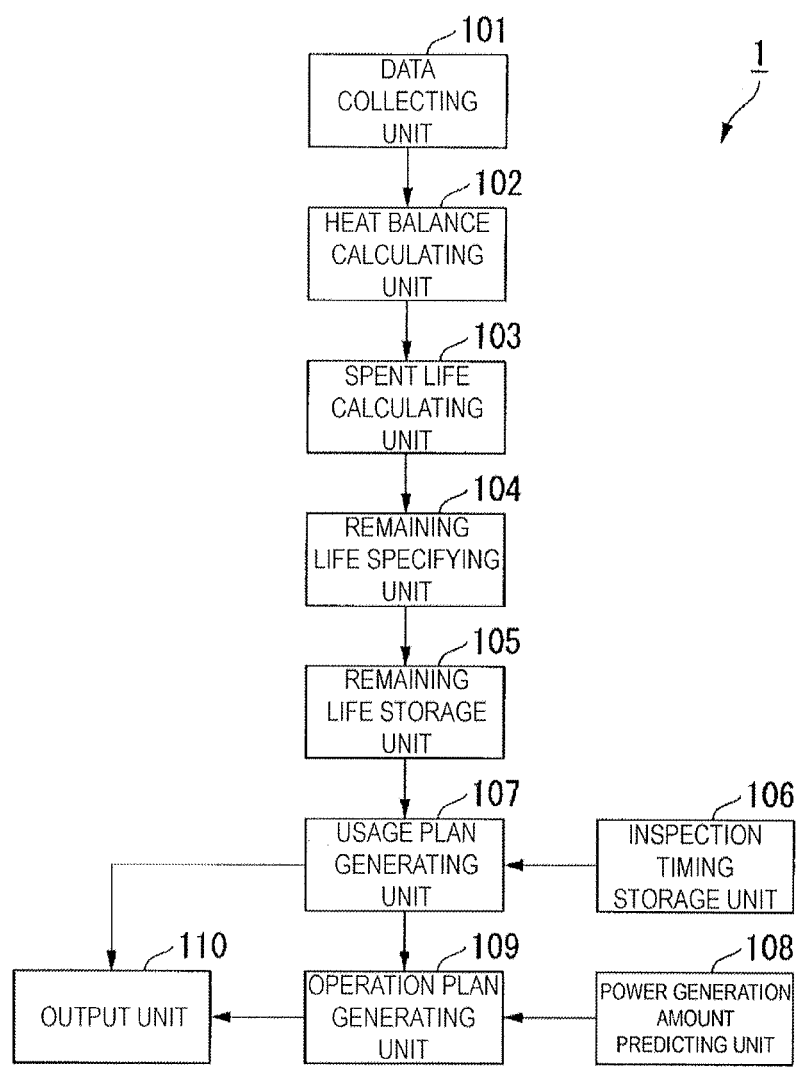
FIG. 1 is a schematic block diagram illustrating a configuration of a planning device according to a first embodiment.

FIG. 1 is a schematic block diagram illustrating a configuration of a planning device according to the first embodiment.

A planning device 1 according to the first embodiment generates a usage plan for a component for a turbine. The usage plan for the component according to the first embodiment is information, with respect to each of components mounted in the turbine under inspection and each of components stored in a warehouse, which indicates whether each of the components should be mounted in the turbine for the next operation or should be stored in the warehouse.

The planning device 1 according to the first embodiment includes a data collecting unit 101, a heat balance calculating unit 102, a spent life calculating unit 103, a remaining life specifying unit 104, a remaining life storage unit 105, an inspection timing storage unit 106, a usage plan generating unit 107, a power generation amount predicting unit 108, an operation plan generating unit 109, and an output unit 110.

The data collecting unit 101 collects operation data of the turbine in real time from a power generation plant owned by a customer. More specifically, the data collecting unit 101 collects the operation data from a sensor provided in the turbine for each predetermined data collection period (5 minutes, for example). The data collection period is a period short enough not to undermine the immediacy of the monitoring. Examples of the operation data include a flow rate, a pressure, a temperature, vibrations, and other state quantities.

The heat balance calculating unit 102 calculates a heat balance of the turbine on the basis of the operation data collected by the data collecting unit 101. The heat balance is the temperature, the pressure, enthalpy, the flow rate, and other state quantities that are associated with each of the components mounted in the turbine. The heat balance calculating unit 102 calculates the heat balance by performing a simulation on the basis of the operation data. Examples of the simulation methods for calculating the heat balance include the finite element method (FEM) and computational fluid dynamics (CFD).

The spent life calculating unit 103 calculates a life of each of the components spent during the last data collection period, on the basis of the heat balance calculated by the heat balance calculating unit 102. In the present embodiment, the spent life is indicated by equivalent operating hours.

The remaining life specifying unit 104 specifies a remaining life of a component by subtracting the spent life calculated by the spent life calculating unit 103 from the remaining life stored in the remaining life storage unit 105.

The remaining life storage unit 105 stores the remaining life of each of the components. The remaining life of the component is obtained by sequentially subtracting the spent life calculated by the spent life calculating unit 103 from a design life prescribed for each of the components.

The inspection timing storage unit 106 stores a date indicating an inspection timing for each of the turbines installed in each of the power generation plants. The inspection of the turbine is implemented at predetermined intervals.

At the inspection timing of the turbine, the usage plan generating unit 107 generates the usage plan for each of the components mounted in the turbine under inspection and each of the components stored in the warehouse.

The power generation amount predicting unit 108 obtains market power demand information via a network, and predicts an amount of power that should be generated by each of the power generation plants under management.

The operation plan generating unit 109 generates an operation plan indicating a load of the turbine.

The output unit 110 outputs the usage plan generated by the usage plan generating unit 107 and the operation plan generated by the operation plan generating unit 109. Examples of output formats of the usage plan and the operation plan include displaying on a display device, recording on a storage medium, and printing on a sheet.

Next, operations of the planning device 1 according to the present embodiment will be described.

Figure 2:
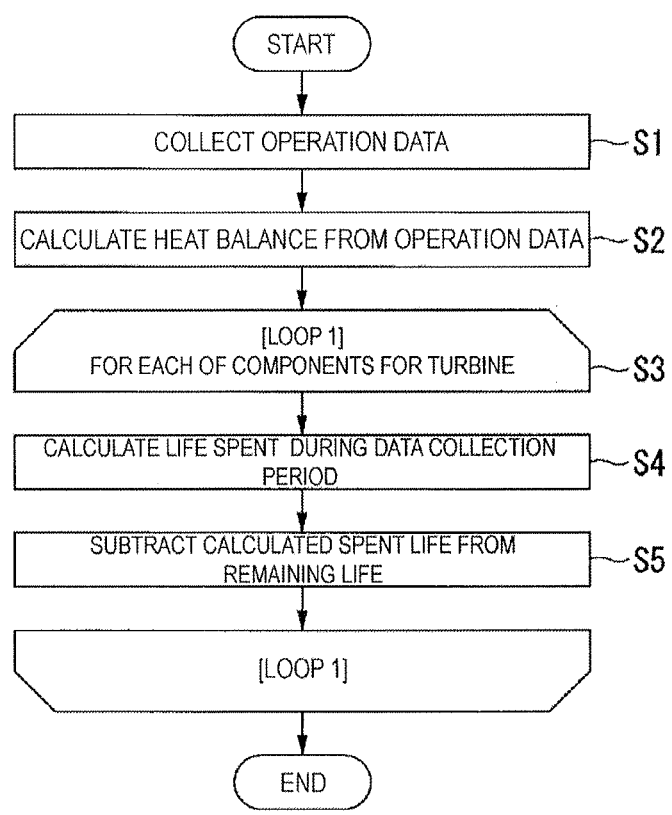
FIG. 2 is a flowchart illustrating operations during each of data collection periods of the planning device according to the first embodiment.

FIG. 2 is a flowchart illustrating operations during each of the data collection periods of the planning device according to the first embodiment.

The planning device 1 performs the following processing during each of the data collection periods.

First, the data collecting unit 101 collects the operation data of the turbine from the sensor provided in the turbine (step S1). Next, the heat balance calculating unit 102 calculates the heat balance of the turbine using the collected operation data as an input (step S2).

Next, the planning device 1 selects, one by one, the components incorporated into the turbine, and with respect to each of the selected components, performs the following processing from step S4 to step S5 (step S3).

First, the spent life calculating unit 103 calculates the life of each of the selected components spent during the last data collection period, using the heat balance calculated by the heat balance calculating unit 102 (step S4). Next, the remaining life specifying unit 104 subtracts the calculated spent life from the remaining life that is associated with each of the selected components and stored in the remaining life storage unit 105. In this way, the remaining life specifying unit 104 updates the remaining life stored in the remaining life storage unit 105.

By performing the above-described processing from step S1 to step S5 during each of the data collection periods, the planning device 1 can maintain the remaining life of each of the components, which is stored in the remaining life storage unit 105, to be in the most up-to-date state.

Next, usage plan generation processing performed by the planning device according to the present embodiment will be described.

Figure 3:
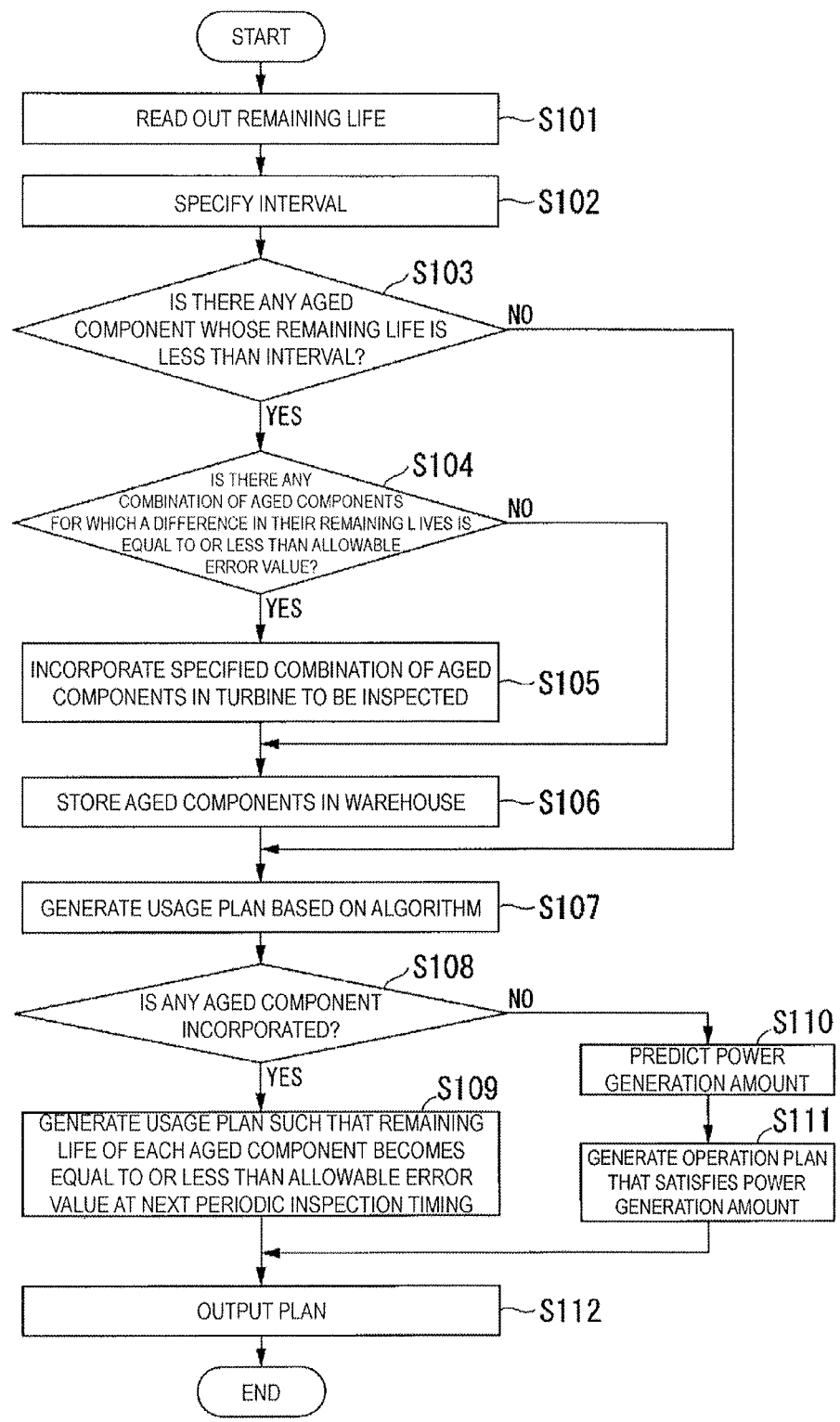
FIG. 3 is a flowchart illustrating usage plan generation processing performed by the planning device according to the first embodiment.

FIG. 3 is a flowchart illustrating the usage plan generation processing performed by the planning device according to the first embodiment.

When the current date falls within an inspection period of the turbine, the planning device 1 starts the usage plan generation processing. First, the usage plan generating unit 107 reads out, from the remaining life storage unit 105, the remaining life that is associated with each of the components incorporated into the turbine to be inspected and with each of the components stored in the warehouse (step S101).

Next, the usage plan generating unit 107 refers to the inspection timing storage unit 106, and specifies an interval up to the next inspection timing (step S102). Next, the usage plan generating unit 107 determines whether there is any component whose remaining life, which has been read out from the remaining life storage unit 105, is less than the interval up to the next inspection period of the turbine to be inspected (step S103). Hereinafter, the component whose remaining life is less than the interval up to the next inspection period will be referred to as an aged component. For example, when the interval between the inspection periods is 18000 hours, a component whose remaining life is less than 18000 hours is regarded to be the aged component.

When there is no aged component (NO at step S103), the usage plan generating unit 107 generates the usage plan for each of the components in accordance with a predetermined algorithm (step S107). For example, the usage plan generating unit 107 can generate the usage plan for each of the components so as to minimize variations in remaining life among the components. Further, the usage plan generating unit 107 can generate the usage plan so as to cause predetermined component groups to be rotated, for example.

On the other hand, when the aged component is present (YES at step S103), the usage plan generating unit 107 determines whether there is any combination of the aged components for which a difference between their remaining lives is equal to or less than an allowable error value (100 hours, for example) (step S104). The combination of aged components is not limited to a combination of two of the aged components, and may be a combination of three or more of the aged components. For example, a combination of a first component whose remaining life is 9950 hours, a second component whose remaining life is 10000 hours, and a third component whose remaining life is 10030 hours is regarded to be the combination of aged components for which the difference between their remaining lives is equal to or less than 100 hours, which is the allowable error value.

When there is no combination of the aged components for which the difference between their remaining lives is equal to or less than the allowable error value (NO at step S104), the usage plan generating unit 107 generates, for each of the aged components, the usage plan indicating that each of the aged components is to be stored in the warehouse (step S106). Next, the usage plan generating unit 107 generates the usage plan in accordance with the predetermined algorithm for each of the remaining components for which the usage plan is not yet determined (step S107). In this way, the usage plan generating unit 107 can generate the usage plan so as to ensure that there is no component that will reach its end of life before the next inspection period.

On the other hand, when the combination of aged components for which the difference between their remaining lives is equal to or less than the allowable error value is present (YES at step S104), the usage plan generating unit 107 generates, for each of the aged components included in the specified combination, the usage plan indicating that each of the aged components is to be incorporated into the turbine to be inspected (step S105). More specifically, when the remaining life of each of the first component and the second component is shorter than an interval between periodic inspections, and a difference between the remaining life of the first component and the remaining life of the second component is equal to or less than the allowable error value, the usage plan generating unit 107 generates the usage plan indicating that the first component and the second component are to be incorporated into the same turbine.

Next, for each of the remaining aged components for which the usage plan is not yet determined, the usage plan generating unit 107 generates the usage plan indicating that each of the aged components is to be stored in the warehouse (step S106). Next, for each of the remaining components for which the usage plan is not yet determined, the usage plan generating unit 107 generates the usage plan in accordance with the predetermined algorithm (step S107). In this way, the usage plan generating unit 107 can generate the usage plan so as to cause each of the aged components included in the specified combination to reach its end of life at substantially the same timing as a result of usage of the turbine to be inspected.

When the usage plan generating unit 107 generates the usage plan, the operation plan generating unit 109 refers to the generated usage plan, and determines whether any of the aged components is to be incorporated into the turbine to be inspected (step S108). When there is the aged component that is to be incorporated into the turbine to be inspected (YES at step S108), the operation plan generating unit 109 generates the operation plan so as to cause the remaining life of the aged component to be equal to or less than the allowable error value at the next periodic inspection timing (step S109). More specifically, the operation plan generating unit 109 generates the operation plan in accordance with the following procedure. First, on the basis of the equivalent operating hours that indicate the remaining life of each of the aged components and the equivalent operating hours during the interval between the periodic inspections, the operation plan generating unit 109 calculates a temperature that causes the remaining lives of all of the aged components to be equal to or less than the allowable error value at the next periodic inspection timing. Next, the operation plan generating unit 109 calculates a load of the turbine that causes a temperature of a part into which the aged components are to be incorporated to become the calculated temperature. Then, the operation plan generating unit 109 generates the operation plan that causes the turbine to be operated at the calculated load.

On the other hand, when there is no aged component that is to be incorporated into the turbine to be inspected (NO at step S108), the power generation amount predicting unit 108 obtains the market power demand information via the network, and predicts the amount of power that should be generated by each of the power generation plants under management (step S110). Next, the operation plan generating unit 109 generates the operation plan of the turbine to be inspected so as to satisfy the predicted amount of power (step S111). More specifically, the operation plan generating unit 109 calculates an optimum allocation of the power generation amount for each of the power generation plants under management, and generates the operation plan for the turbine to be inspected on the basis of the calculated allocation of the power generation amount. At this time, when some of the turbines are to be operated on the basis of the operation plan generated at step S109, the operation plan generating unit 109 calculates the allocation of the power generation amount for the remaining turbines so as to satisfy the power generation amount that has been predicted by the power generation amount predicting unit 108.

Then, the output unit 110 outputs the usage plan generated by the usage plan generating unit 107 and the operation plan generated by the operation plan generating unit 109 (step S112).

In this way, the planning device 1 according to the present embodiment specifies the remaining life of the component for the turbine, and generates the usage plan so as to cause a plurality of aged components to reach their end of life at the same timing. By causing the plurality of components to reach their end of life at the same timing, the number of times that the turbine is stopped for replacing the components, or the frequency at which the turbine is operated at a partial load in order to stop the components from reaching their end of life before the next periodic inspection can be reduced. Thus, the planning device 1 allows the aged component to be efficiently used without changing a timing of a self-inspection.

Further, the planning device 1 according to the present embodiment generates the operation plan for the turbine such that the timing of the plurality of aged components reaching their end of life coincides with the inspection timing of the turbine. In this way, a user can replace the components that have reached their end of life at the inspection timing. As a result, the user can eliminate the need to stop the turbine simply for replacing the components that have reached their end of life. Note that the planning device 1 according to another embodiment need not necessarily change the operation plan depending on whether the aged components are incorporated into the turbine. For example, by setting a self-inspection at a timing before the timing of the periodic inspection, the components that have reached their end of life may be replaced at the self-inspection timing. Further, when there are a plurality of turbines that have mutually different intervals of inspection timings and mutually different loads under normal operation, the planning device 1 according to another embodiment may determine the usage plan such that the aged component included in the specified combination is incorporated into the turbine in which a difference between the spent life, which is specified on the basis of the interval and the load, and the remaining life of the aged component is equal to or less than the allowable error value. At this time, the turbine into which the aged component is incorporated need not necessarily be provided in a plant owned by the same customer.

Second Embodiment

The planning device 1 according to the first embodiment generates the usage plan so as to cause the remaining life of a certain component to be equal to or less than the allowable error value at a timing at which the remaining life of another component becomes equal to or less than the allowable error value.

Meanwhile, a planning device 2 according to a second embodiment generates the usage plan so as to cause the remaining life of a component to be equal to or less than the allowable error value at the periodic inspection timing of the turbine.

Figure 4:
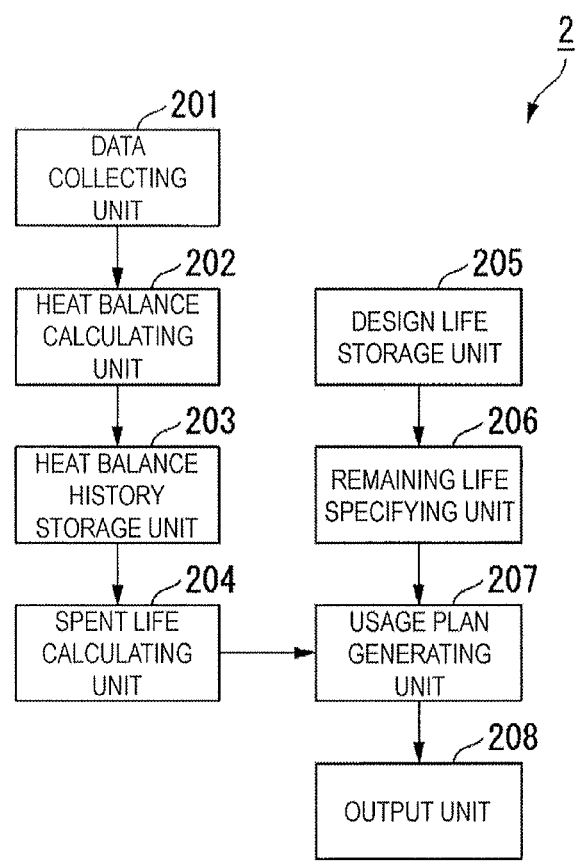
FIG. 4 is a schematic block diagram illustrating a configuration of a planning device according to a second embodiment.

FIG. 4 is a schematic block diagram illustrating a configuration of the planning device according to the second embodiment.

The usage plan according to the second embodiment is information, with respect to each of the components, which indicates a type of the turbine in which the component is to be mounted and the number of times that the component is to be mounted in the turbine. For example, when the planning device 2 manages three types of turbines, namely, a turbine A, a turbine B, and a turbine C, the usage plan regarding a certain component indicates the number of times that the component is to be mounted in the turbine A, the number of times that the component is to be mounted in the turbine B, and the number of times that the component is to be mounted in the turbine C.

The planning device 2 according to the second embodiment includes a data collecting unit 201, a heat balance calculating unit 202, a heat balance history storage unit 203, a spent life calculating unit 204, a design life storage unit 205, a remaining life specifying unit 206, a usage plan generating unit 207, and an output unit 208.

The data collecting unit 201 collects the operation data of the turbine in real time from the power generation plant owned by the customer. The heat balance calculating unit 202 calculates the heat balance of the turbine on the basis of the operation data collected by the data collecting unit 201. The heat balance history storage unit 203 chronologically stores the heat balance calculated by the heat balance calculating unit 202.

On the basis of the heat balance during the last interval between the inspection timings, which is stored in the heat balance history storage unit 203, the spent life calculating unit 204 calculates the spent life of each of the components resulting from the operation during the interval. The design life storage unit 205 stores the design life of each type of the components. The remaining life specifying unit 206 obtains, from the design life storage unit 205, the design life associated with the component for which the usage plan is to be generated. When a new component is introduced, the usage plan generating unit 207 generates the usage plan so as to cause the component to reach its end of life at a periodic inspection timing of the turbine. The output unit 208 outputs the usage plan generated by the usage plan generating unit 207.

Next, usage plan generation processing performed by the planning device according to the present embodiment will be described.

Figure 5:
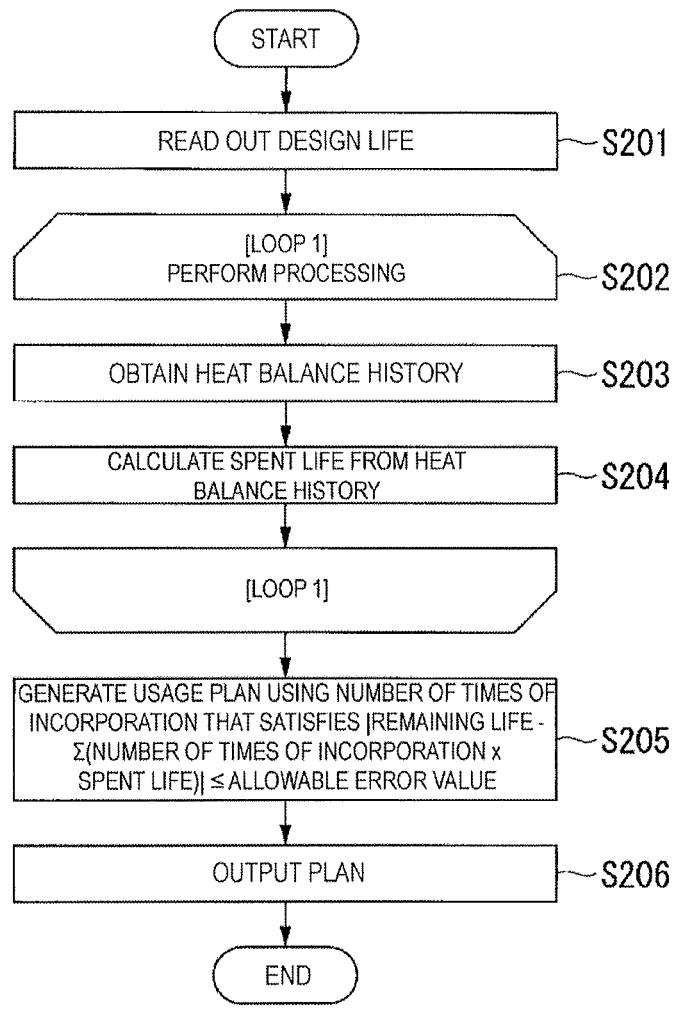
FIG. 5 is a flowchart illustrating usage plan generation processing performed by the planning device according to the second embodiment.

FIG. 5 is a flowchart illustrating the usage plan generation processing performed by the planning device according to the second embodiment.

When a new component for a turbine is introduced, the planning device 2 starts the usage plan generation processing for the component. First, the remaining life specifying unit 206 reads out the design life associated with the type of the introduced component from the design life storage unit 205 (step S201). In this way, the remaining life specifying unit 206 specifies the remaining life of the introduced component.

Next, the spent life calculating unit 204 selects, one by one, each of the turbines under management and performs the following processing from step S203 to step S204 for each of the turbines (step S202).

The spent life calculating unit 204 obtains a heat balance history of the same type of the component as the introduced component during the last interval, which is stored in the heat balance history storage unit 203 (step S203). Then, on the basis of the obtained heat balance history, the spent life calculating unit 204 calculates the spent life of the component resulting from the operation of the selected turbine during the interval (step S204).

When the spent life calculating unit 204 calculates the spent life of the same type of the component as the introduced component for all of the turbines, the usage plan generating unit 207 calculates a number of times of incorporation into each of the turbines $a_k$ that satisfies Relationship (1) below, and generates the usage plan indicating the calculated number of times of incorporation into each of the turbines (step S205).

[Relationship 1]

$$\left| t_0 - \sum_{k=1}^{n} a_k t_k \right| \leq t_a \qquad (1)$$

$t_0$ indicates the remaining life of the introduced component. n indicates the number of turbines. $a_k$ indicates the number of times of incorporation into a $k^{th}$ turbine. $t_k$ indicates the spent life resulting from the operation of the $k^{th}$ turbine during the interval. $t_a$ indicates the allowable error value.

In other words, the usage plan generating unit 207 generates the usage plan indicating the number of times of incorporation into each of the turbines, such that a difference between a total sum of values obtained by multiplying the spent life with the number of times of incorporation into each of the turbines, and the remaining life of the component that has been introduced becomes equal to or less than a predetermined value. For example, when, during an interval, the spent life of the turbine A is 10000 hours, the spent life of the turbine B is 10300 hours, the spent life of the turbine C is 9800 hours, and the remaining life of the newly introduced component is 60000 hours, the usage plan generating unit 207 generates a usage plan that specifies that the number of times of incorporation into the turbine A is once, the number of times of incorporation into the turbine B is twice, and the number of times of incorporation into the turbine C is three times.

When the usage plan generating unit 207 generates the usage plan, the output unit 208 outputs the generated usage plan (step S206).

In this way, the planning device 2 according to the present embodiment specifies the remaining life of the component for the turbines, and generates the usage plan so as to cause the component to reach its end of life at an inspection timing of a certain turbine. By causing the component for the turbine to reach its end of life at the inspection timing, there is no need to stop the turbine simply to replace the component, and in addition, there is no need to operate the turbine at a partial load so as to stop the component from reaching its end of life before the inspection timing. Thus, the planning device 2 allows the component to be efficiently used without changing the timing of the self-inspection.

Note that the planning device 2 according to the present embodiment generates the usage plan for the component with respect to a newly introduced component. This is because the usage plan is already determined for already introduced components. Meanwhile, the planning device 2 according to another embodiment may review the usage plan for the already introduced component once again in the course of using the component. For example, when an operation method of at least one of the turbines has changed between now and the time at which the usage plan was generated, the usage plan is reviewed. In this case, the planning device 2 includes the remaining life storage unit 105 as in the first embodiment, and the remaining life specifying unit 206 can specify the remaining life of the component to be reviewed by obtaining the remaining life of the component from the remaining life storage unit 105.

Embodiments have been described above in detail with reference to the appended drawings. However, a specific configuration is not limited to those described above, and various design changes and the like may be made.

For example, the planning device 1 and the planning device 2 according to the above-described embodiments calculate the remaining life and the spent life of the component using the equivalent operating hours, but the configuration is not limited to this example. For example, the planning device 1 and the planning device 2 according to another embodiment may calculate the remaining life and the spent life of the component using another parameter, such as the Larson-Miller parameter (LMP).

The LMP is a parameter that is calculated by Equation (2) below.

$$\text{LMP} = T(\log t + C) \qquad (2)$$

T indicates a thermodynamic temperature of the component. A thermodynamic temperature is equal to a value obtained by adding 273.15 to a Celsius temperature. The temperature of the component is specified by the heat balance. t indicates an operating time of the turbine at the temperature T. C is a fixed value that is determined by a material of the component. For example, when the material of the component is low-carbon steel or chrome-molybdenum steel, the fixed value C may be 20. Further, when the material of the component is stainless steel, the fixed value C may be 15.

In this case, the spent life is calculated by converting the LMP, which is specified on the basis of an actual temperature of the component and the operating time, into an operating time at a rated temperature.

Further, the planning device 1 according to another embodiment may determine whether a component reaches its end of life due to low cycle fatigue, by using a temperature history variable that indicates a relationship between the temperature and the number of cycles. Further, the planning device 1 according to another embodiment may determine whether the component reaches its end of life on the basis of a plurality of deterioration causes, such as creep deformation and low cycle fatigue, while using a plurality of temperature history variables.

Further, in the above-described embodiment, the planning device 1 calculates the remaining life of the entire turbine on the basis of the spent life of each of the components that configure the turbine, but the configuration is not limited to this example. For example, the planning device 1 according to another embodiment may directly calculate the remaining life of the entire turbine on the basis of the design life of the entire turbine without calculating the spent life of each of the components.

Further, in the above-described embodiment, the spent life calculating unit 103 and the remaining life specifying unit 104 perform the calculation on the basis of the heat balance calculated by the heat balance calculating unit 102, but the configuration is not limited to this example. For example, in another embodiment, at least one of the spent life calculating unit 103 and the remaining life specifying unit 104 may perform the calculation on the basis of the operation data collected by the data collecting unit 101.

In particular, in another embodiment, when both of the spent life calculating unit 103 and the remaining life specifying unit 104 perform the calculation on the basis of the operation data collected by the data collecting unit 101, the planning device 1 need not necessarily include the heat balance calculating unit 102.

Figure 6:
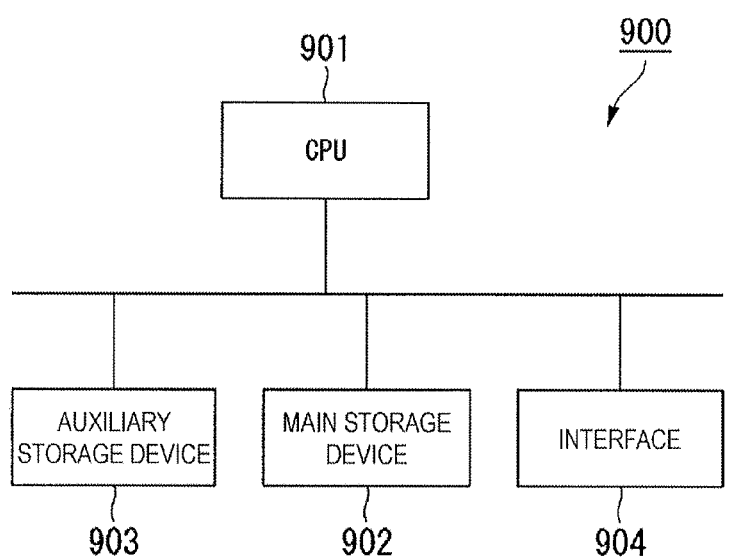
FIG. 6 is a schematic block diagram illustrating a configuration of a computer according to at least one of the embodiments.

FIG. 6 is a schematic block diagram illustrating a configuration of a computer according to at least one of the embodiments.

A computer 900 includes a CPU 901, a main storage device 902, an auxiliary storage device 903, and an interface 904.

The above-described planning device 1 and planning device 2 are installed in the computer 900. Then, the operation of each of the above-described processing units is stored in the auxiliary storage device 903 in the form of a program. The CPU 901 reads out the program from the auxiliary storage device 903, loads the program into the main storage device 902, and performs the above-described processing in accordance with the program. Further, in accordance with the program, the CPU 901 secures storage regions corresponding to the above-described storage units in the main storage device 902.

Note that, in at least one of the embodiments, the auxiliary storage device 903 is an example of non-temporary tangible media. Other examples of the non-temporary tangible media include a magnetic disk, a magneto-optical disk, a CD-ROM, a DVD-ROM, a semiconductor memory, and the like that are connected via the interface 904. Further, when the program is distributed to the computer 900 via a communication line, the computer 900 that receives the distribution may load the program into the main storage device 902 and perform the above-described processing.

Further, the above-described program may realize some of the above-described functions.

In addition, the above-described program may realize the above-described functions in combination with another program already stored in the auxiliary storage device 903. In other words, the above-described program may be a so-called differential file (differential program).

INDUSTRIAL APPLICABILITY

A planning device of the present invention generates a usage plan so as to cause a remaining life of a component to be equal to or less than an allowable error value. In this way, the planning device allows the component for a turbine to be efficiently used without changing a timing of a self-inspection.

REFERENCE SIGNS LIST

1 Planning device
101 Data collecting unit
102 Heat balance calculating unit
103 Spent life calculating unit
104 Remaining life specifying unit
105 Remaining life storage unit
106 Inspection timing storage unit
107 Usage plan generating unit
108 Power generation amount predicting unit
109 Operation plan generating unit
110 Output unit
2 Planning device
201 Data collecting unit
202 Heat balance calculating unit
203 Heat balance history storage unit
204 Spent life calculating unit
205 Design life storage unit
206 Remaining life specifying unit
207 Usage plan generating unit
208 Output unit
900 Computer
901 CPU
902 Main storage device
903 Auxiliary storage device
904 Interface

The invention claimed is:

1. A turbine system comprising:
a turbine;
a sensor provided in the turbine for collecting operation data of the turbine; and
a planning device comprising a processor and a memory storing a program, wherein the program causes the processer to function as:
a remaining life specifying unit configured to specify remaining lives of components for the turbine based on the operation data collected by the sensor;
a usage plan generating unit configured to specify aged components based on the specified remaining lives of the components, the aged components being the components remaining life of which is shorter than an interval up to a next periodic inspection period, and to generate a usage plan of the components, at a periodic inspection period, in which a combination of the aged components for which a difference between the remaining lives is equal to or less than an allowable error value is incorporated into the turbine and the aged components unrelated to the combination are stored in a warehouse; and
a load determination unit configured to determine, based on the specified remaining lives and the interval, a load of the turbine into which the components are to be incorporated such that the remaining life of each of the combination of the aged components at the next periodic inspection timing becomes equal to or less than the allowable error value,
wherein the turbine is operated at the load determined by the load determination unit.

2. The turbine system according to claim 1, wherein the usage plan generating unit generates, based on the specified remaining lives, the usage plan such that the remaining life of each of the aged components that have been incorporated into the same turbine becomes equal to or less than the allowable error value at the same timing.

3. The turbine system according to claim 2, wherein, when the remaining life of a first component and the remaining life of a second component are shorter than an interval between periodic inspections, and a difference between the remaining life of the first component and the remaining life of the second component is equal to or less than an allowable error value, the usage plan generating unit generates the usage plan that indicates that the first component and the second component are to be incorporated into the same turbine.

4. The turbine system according to claim 1, further comprising a plurality of turbines including the turbine, wherein the program causes the processor to function as:
a spent life calculating unit configured to calculate, for the plurality of turbines, lives of the components spent during an interval between periodic inspections,
wherein the usage plan generating unit generates the usage plan that indicates a number of times of incorporation of the components into each of the plurality of turbines, such that a difference between a total sum of values obtained by multiplying the number of times of incorporation into each of the plurality of turbines with the spent lives, and the remaining lives of the components becomes equal to or less than a predetermined value.

5. A planning method for a turbine system having a turbine and a sensor provided in the turbine for collecting operation data of the turbine, the planning method comprising:
- specifying remaining lives of components for the turbine, by a processer, based on the operation data collected by the sensor;
- specifying aged components based on the specified remaining lives of the components by the processer, the aged components being the components remaining life of which is shorter than an interval up to a next periodic inspection period;
- generating a usage plan of the components at a periodic inspection period by the processer, the usage plan indicating that a combination of the aged components for which a difference between the remaining lives is equal to or less than an allowable error value is to be incorporated into the turbine and that the aged components unrelated to the combination are to be stored in a warehouse;
- determining, based on the specified remaining lives and the interval, a load of the turbine into which the components are to be incorporated such that the remaining life of each of the combination of the aged components at the next periodic inspection timing becomes equal to or less than the allowable error value;
- incorporating the combination of the aged components into the turbine; and
- operating the turbine at the determined load.

6. A planning method for allowing components for a turbine to be used efficiently without changing a timing of a self-inspection, the planning method comprising:
- specifying remaining lives of components for the turbine by a processer;
- specifying aged components based on the specified remaining lives of the components by the processer, the aged components being the components remaining life of which is shorter than an interval up to a next periodic inspection period;
- generating a usage plan of the components at a periodic inspection period by the processer, the usage plan indicating that a combination of the aged components for which a difference between the remaining lives is equal to or less than an allowable error value is to be incorporated into the turbine and that the aged components unrelated to the combination are to be stored in a warehouse;
- determining, based on the specified remaining lives and the interval, a load of the turbine into which the components are to be incorporated such that the remaining life of each of the combination of the aged components at the next periodic inspection timing becomes equal to or less than the allowable error value;
- incorporating the combination of the aged components into the turbine; and
- operating the turbine at the determined load.

* * * * *